United States Patent [19]
O'Neill

[11] Patent Number: 5,193,298
[45] Date of Patent: Mar. 16, 1993

[54] FISHING ROD APPARATUS

[76] Inventor: James A. O'Neill, P.O. Box 722, Honeybrook, Pa. 19344

[21] Appl. No.: 826,032

[22] Filed: Jan. 27, 1992

[51] Int. Cl.⁵ ............................................. A01K 91/02
[52] U.S. Cl. ................................................... 43/19
[58] Field of Search ........................................... 43/19

[56] References Cited

U.S. PATENT DOCUMENTS

| | | | |
|---|---|---|---|
| 2,584,678 | 2/1952 | Dewey | 43/19 |
| 2,823,482 | 2/1958 | Kremski | 43/19 |
| 2,932,111 | 4/1960 | Kremski | 43/19 |
| 2,958,975 | 11/1960 | Neff | 43/19 |
| 2,977,706 | 4/1961 | Merz | 43/19 |
| 3,000,129 | 9/1961 | Rainey | 43/19 |
| 3,111,783 | 11/1963 | Dillin | 43/19 |
| 3,279,115 | 10/1966 | Worsham | 43/19 |
| 3,392,473 | 7/1968 | Dietsch | 43/19 |
| 3,400,480 | 9/1968 | Worsham | 43/19 |
| 3,416,256 | 12/1968 | Blocker | 43/19 |
| 3,419,991 | 1/1969 | Mitchell | 43/19 |
| 3,656,252 | 4/1972 | Sherman | 43/19 |
| 3,828,459 | 8/1974 | Easom | 43/19 |
| 3,962,813 | 6/1976 | Moon | 43/19 |
| 4,501,085 | 2/1985 | Barnes | 43/19 |

Primary Examiner—Kurt C. Rowan
Attorney, Agent, or Firm—Leon Gilden

[57] ABSTRACT

A fishing rod apparatus is arranged with a first and second rod tube reciprocatably mounting a plunger therethrough. The second rod tube selectively utilizes spring or pneumatic pressure to direct the rod exteriorly through a forward end portion of the first tube. The forward end portion of the first tube is arranged to position a fishing line support such as a float to direct the associated fishing line to a desired target casting position relative to the rod structure.

2 Claims, 4 Drawing Sheets

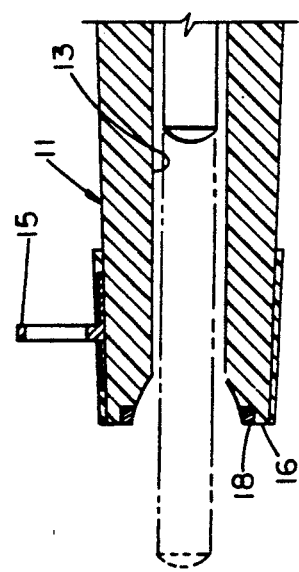
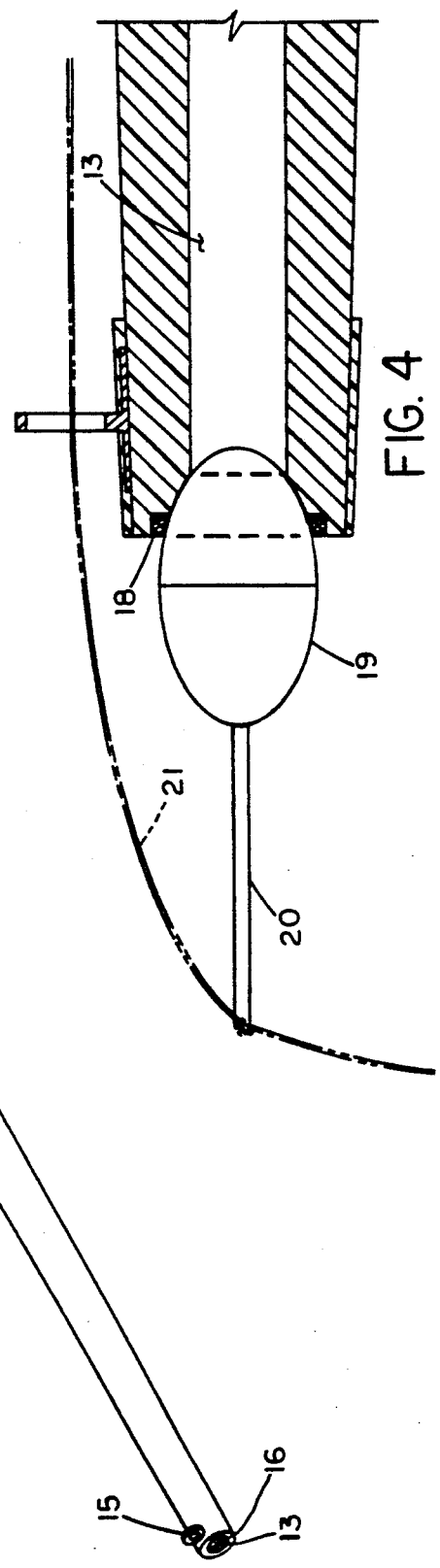

FISHING ROD APPARATUS

BACKGROUND OF THE INVENTION

1. Field of the Invention

The field of invention relates to fishing rod apparatus, and more particularly pertains to a new and improved fishing rod apparatus wherein the same is arranged to eliminate arcuate pivotment of the fishing rod structure permitting linear projection of a fishing line.

2. Description of the Prior Art

In a typical fishing casting procedure, the arcuate swing of the fishing rod permits ease of entanglement of fishing rod relative to surrounding obstacles such as tree limbs and the like. To overcome deficiencies of the prior art, the instant invention sets forth a projectile structure to linearly direct the fishing line exteriorly of the fishing rod structure.

Various fishing assist structures available in the prior art such as set forth in U.S. Pat. No. 4,439,944 to Johnson wherein a fishing rod is arranged for securement to a wheel chair.

U.S. Pat. No. 4,656,773 to Klefbeck sets forth a device to include a spool capable of receiving interchangeable rod blanks.

U.S. Pat. No. 4,845,880 to Miller sets forth a casting rod employing an elastic propellent device relative to the fishing line.

U.S. Pat. No. 4,217,719 to McDonnell sets forth a fishing apparatus wherein a hooker and line propellent means is arranged relative to a support stub mounted to an underlying support base.

As such, it may be appreciated that there continues to be a need for a new and improved fishing rod apparatus as set forth by the instant invention which addresses the problems of ease of use as well as effectiveness in construction and in this respect, the present invention substantially fulfills this need.

SUMMARY OF THE INVENTION

In view of the foregoing disadvantages inherent in the known types of fishing rod apparatus now present in the prior art, the present invention provides a fishing rod apparatus wherein the same is arranged to propel a fishing line relative to an elongate fishing rod. As such, the general purpose of the present invention, which will be described subsequently in greater detail, is to provide a new and improved fishing rod apparatus which has all the advantages of the prior art fishing rod apparatus and none of the disadvantages.

To attain this, the present invention provides a fishing rod apparatus arranged with a first and second rod tube reciprocatably mounting a plunger therethrough. The second rod tube selectively utilizes spring or pneumatic pressure to direct the rod exteriorly through a forward end portion of the first tube. The forward end portion of the first tube is arranged to position a fishing line support such as a float to direct the associated fishing line to a desired target casting position relative to the rod structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod apparatus which has all the advantages of the prior art fishing rod apparatus and none of the disadvantages.

It is another object of the present invention to provide a new and improved fishing rod apparatus which may be easily and efficiently manufactured and marketed.

It is a further object of the present invention to provide a new and improved fishing rod apparatus which is of a durable and reliable construction.

An even further object of the present invention is to provide a new and improved fishing rod apparatus which is susceptible of a low cost of manufacture with regard to both materials and labor, and which accordingly is then susceptible of low prices of sale to the consuming public, thereby making such fishing rod apparatus economically available to the buying public.

Still yet another object of the present invention is to provide a new and improved fishing rod apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic cross-sectional illustration of a forward end portion of the first tube of the invention.

FIG. 4 is an enlarged orthographic view of the forward end of the first tube of the invention illustrating mounting of the float member thereto.

FIG. 11 is an isometric illustration of the first tube of the invention.

DESCRIPTION OF THE PREFERRED EMBODIMENT

Figure 1:
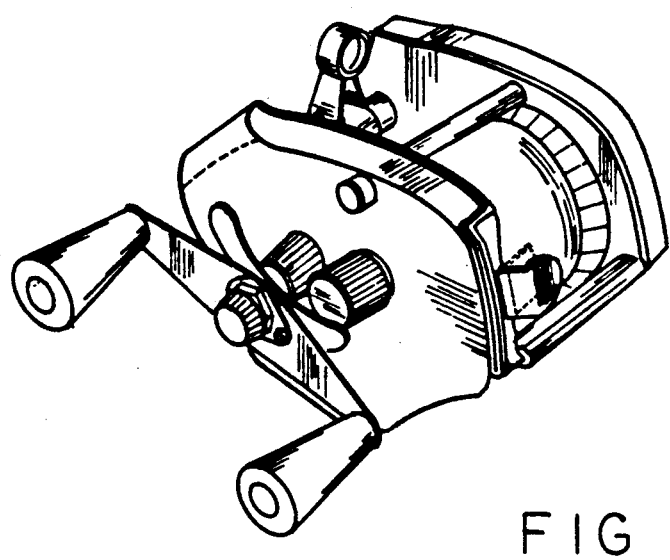
FIG. 1 is an isometric illustration of a prior art fishing rod structure as set forth in the U.S. Pat. No. 4,964,590.

With reference now to the drawings, and in particular to FIGS. 1 to 12 thereof, a new and improved fishing rod apparatus embodying the principles and concepts of the present invention and generally designated by the reference numerals 10 and 10a will be described.

Figure 2:
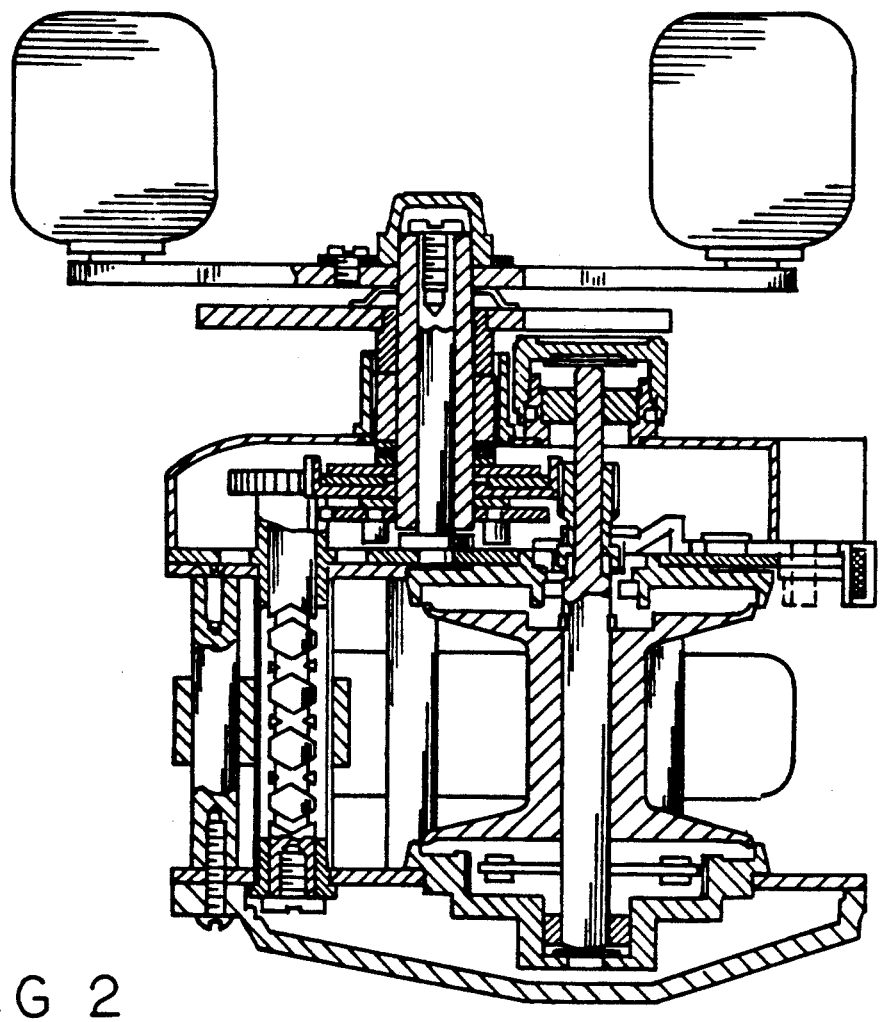
FIG. 2 is an orthographic top view of the fishing rod structure as set forth in FIG. 1.

The FIGS. 1 and 2 illustrate a prior art fishing reel structure as set forth in the U.S. Pat. No. 4,964,590 indicative of prior art fishing reels of a type typically employed by the instant invention, incorporated herein by reference.

Figure 5:
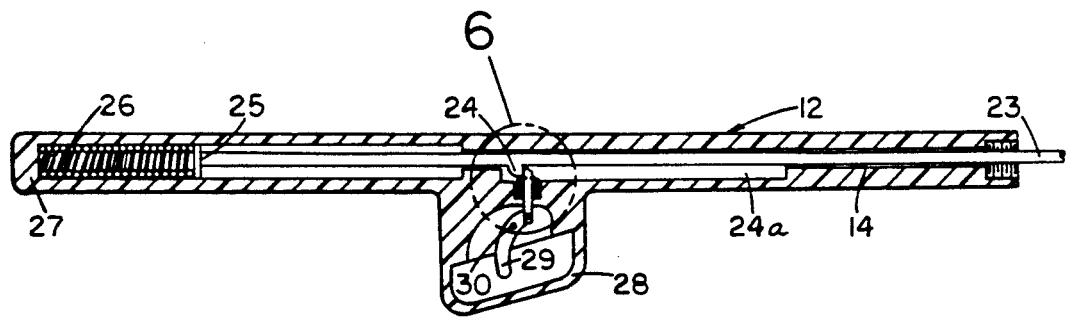
FIG. 5 is an orthographic cross-sectional illustration of the second tube of the invention.
Figure 12:
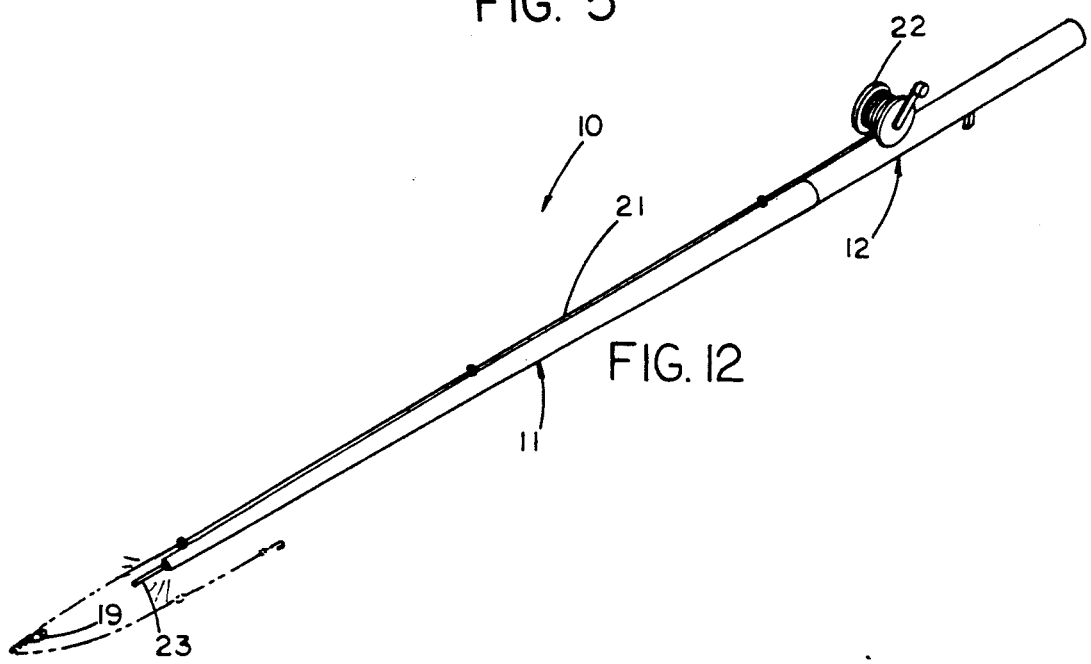
FIG. 12 is an isometric illustration of the invention in assembled configuration.
Figure 10:
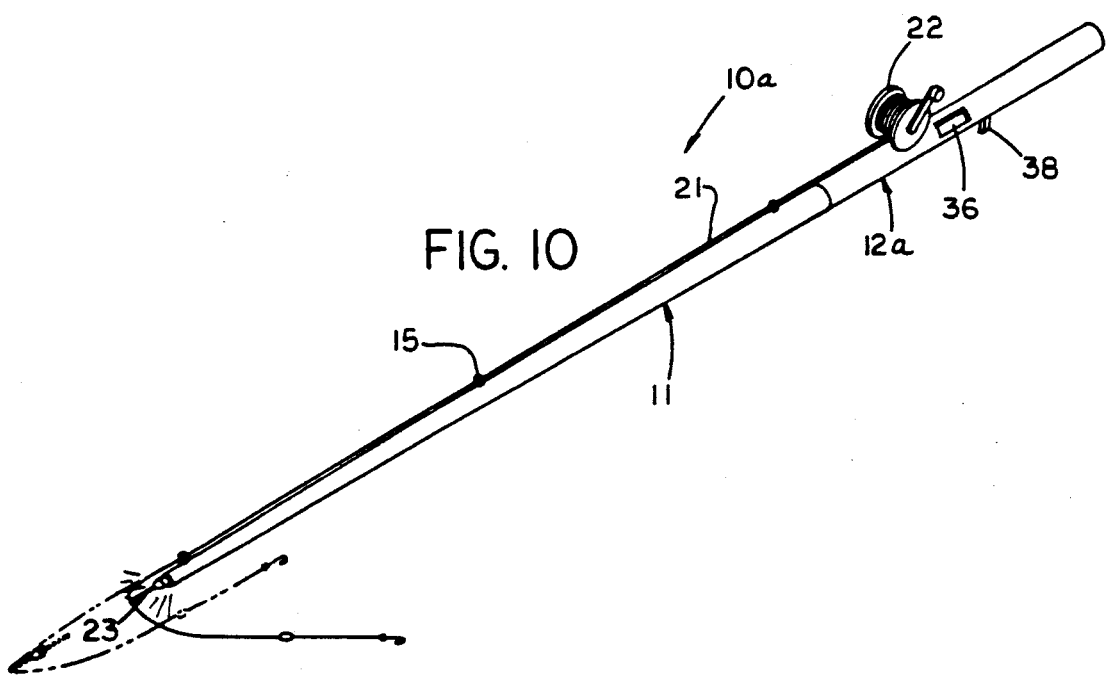
FIG. 10 is an isometric illustration of a modified fishing rod structure in an assembled configuration.

More specifically, the fishing rod apparatus 10 of the instant invention essentially comprises a first rod tube 11 selectively securable to a second rod tube 12. The first rod tube 11 includes a first rod tube bore 13 directed coextensively therethrough that is coaxially aligned with second rod tube bore 14 of the second rod tube that terminates relative to the second rod tube rear wall 27 (see FIG. 5). A plurality of first tube guide loops 15 are fixedly mounted to an exterior surface of the first rod tube as the loops are coaxially aligned relative to one another. The loops 15 are arranged for cooperation with a fishing reel 22, such as illustrated in FIGS. 10 and 12, to direct a fishing line 21 from the fishing reel 22 through the loops 15 that are coaxially aligned relative to one another to receive the fishing line in an aligned relationship relative to the first rod tube. The first tube includes a first tube forward end 16 and a first tube externally threaded receiving boss 17 at a rear distal end of the first tube 15 as the receiving boss 17 is coaxially aligned with the first tube and is arranged for threaded reception of the forward end of the second tube 12, as illustrated in FIG. 5. A ferrous magnetic ring 18 is mounted in surrounding relationship relative to the first tube bore 13 at the first tube forward end 16 to magnetically adhere a ferrous float member 19 that in turn is arranged to secure the fishing line 21 thereto. The float member includes a positioning rod 20 extending coaxially and forwardly of the float member to position the fishing line in a non-binding relationship and space the fishing line relative to the forward end of the first rod tube.

Figure 6:
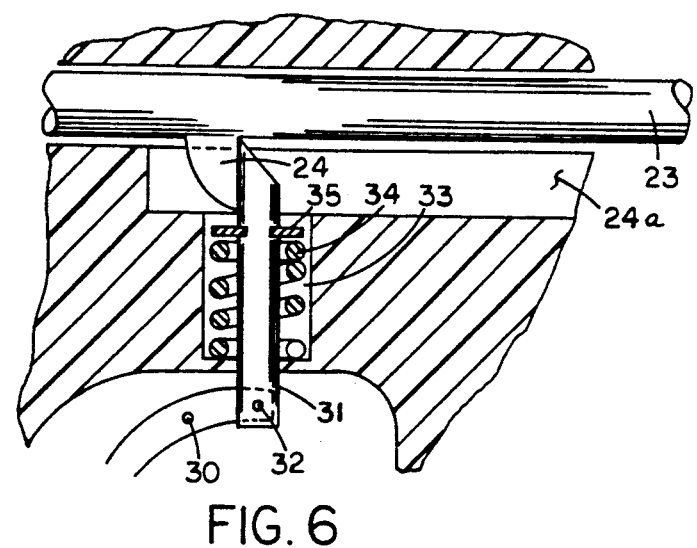
FIG. 6 is an enlarged orthographic view of section 6 as set forth in FIG. 5.
Figure 7:
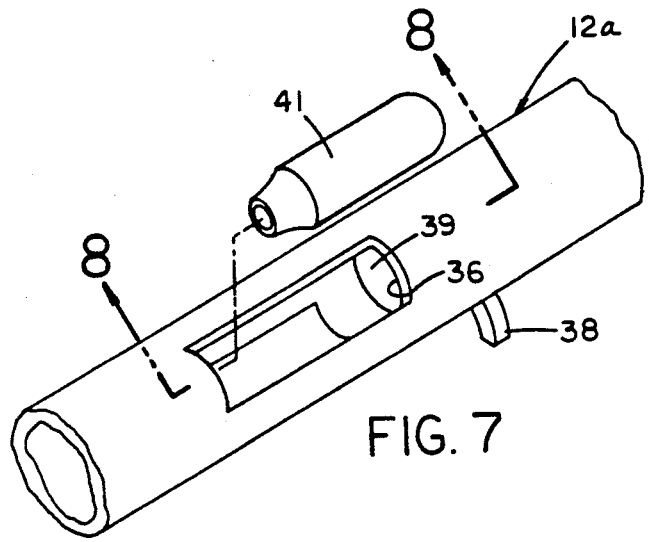
FIG. 7 is an isometric partial view of a modified second tube of the invention.
Figure 8:
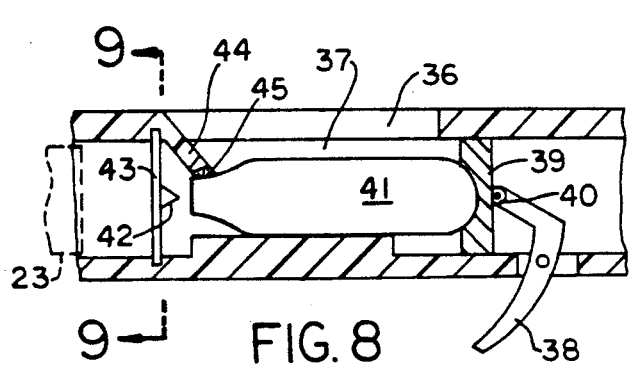
FIG. 8 is an orthographic view, taken along the lines 8—8 of FIG. 7 in the direction indicated by the arrows.
Figure 9:
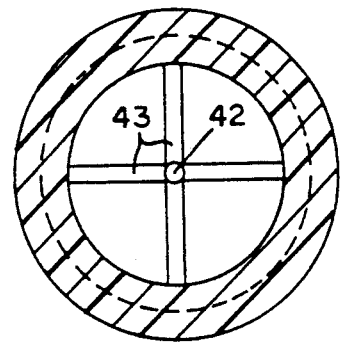
FIG. 9 is an orthographic view, taken along the lines 9—9 of FIG. 8 in the direction indicated by the arrows.

An ejector rod 23 is reciprocatably mounted within the first and second rod tubes within the respective first and second tube bores 13 and 14. In a first retracted position, the ejector rod 23 forward distal end is spaced within the first tube from the first tube forward end 16, whereupon release of the ejector rod 23 effects projection of the forward distal ends of the ejector rod relative to the forward end of the first rod tube, in a manner as illustrated in the FIGS. 10 and 12. The ejector rod 23 includes an ejector rod lug 24 slidably received within a lug receiving groove within the second rod tube 12 (see FIG. 5). The ejector rod includes an ejector rod rear plate mounted to a rear distal end of the ejector rod to capture an ejector rod spring 26 between the rear plate 25 and the second rod tube rear wall 27. As illustrated in FIG. 5 and FIG. 6, release of the ejector rod is effected by the retraction of an abutment rod 31 orthogonally oriented relative to the ejector rod. The abutment rod 31 is mounted within a trigger housing 28, with the use of a trigger 29 pivotally mounted to the trigger housing about a trigger pivot axle 30. The abutment rod 31 is pivotally mounted at its lower distal end about an abutment rod pivot axle 32 to a forward distal end of the trigger 29. Pivotment of the trigger 29 relative to the trigger housing effects displacement from the receiving groove 24a of an upper distal end of the abutment rod and release of the ejector rod 23. An abutment rod receiving cavity 33 formed within the trigger housing 28 includes an abutment rod spring 34 captured within the receiving cavity 33 between a floor of the receiving cavity and abutment rod spring plate 35 to normally bias the abutment rod in an engaged relationship relative to the ejector rod lug 24.

FIGS. 7–10 illustrate the use of a modified apparatus 10a, wherein the use is specifically of a modified second rod tube 12a that includes a second tube entrance opening 36 to receive a compressed gas canister 41 therethrough. The canister 41 is received within a canister chamber 37 within the second rod tube 12a, wherein a trigger 38 pivotally mounted about a trigger axle 40 includes a trigger push plate 39 positioned rearwardly forming a rear wall in the canister chamber 37, whereupon rotation of the trigger effects forward displacement of the trigger push plate 39 against the compressed gas canister 41. A puncture spike 42 mounted upon a plurality of crossed spike support ribs 43 permits projection of compressed gas within the canister to a rear face of the ejector rod 23 to effect its projection to the second position, as illustrated in FIG. 10, in an orientation forwardly of the first tube forward end 16. A sealing plate 44 is directed and canted downwardly relative to a forward end of the entrance opening 36 and includes a compressible foot 45 to effect a sealing relationship between the canister and the chamber 37. Further, actuation of the trigger 38 effects the projection of the ejector rod, as illustrated in the FIG. 10, in a casting procedure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod apparatus, comprising,
    a first rod tube, with the first rod tube including a first tube forward end, and
    a first tube bore directed coextensively through the first tube, and
    a second rod tube, the second rod tube including a second tube bore extending from a forward end of the second tube coaxially aligned with the second tube, with the second rod tube terminating in a second rod tube rear wall, and
    a plurality of first coaxially aligned tube guide loops mounted to an exterior surface of the first rod tube, and
    a fishing reel mounted to the second rod tube aligned with the first tube guide loops, and
    fishing line directed from the fishing reel through the guide loops, and
    a ferrous float member, the ferrous float member including a positioning rod extending from the ferrous float member securing the fishing line, and
    the ferrous float member arranged for reception within the first tube forward end, and
    an ejector rod reciprocatably mounted within the first rod tube and the second rod tube, with control means mounted to the second rod tube for securing the ejector rod in a first position, with the first rod tube spaced from the first tube forward end and the control means arranged for releasing the ejector rod to a second position, wherein the ejector rod projects exteriorly of the first tube forward end for projecting the float member and the fishing line from the first rod tube, and
    a magnetic ring mounted within the first tube forward end in surrounding relationship relative to the first tube bore, with the ejector rod slidably and reciprocatably mounted within the first tube bore and the second tube bore, and
    the second rod tube includes a lug receiving groove directed through the second rod tube, and a trigger housing mounted below the groove, and a trigger pivotally mounted within the trigger housing, and a trigger pivot axle pivotally mounting the trigger to the trigger housing, and an abutment rod orthogonally oriented and slidably directed through the trigger housing and orthogonally oriented relative to the ejector rod, wherein the ejector rod includes a lug slidably received within the groove and the abutment rod is in confronting relationship relative to the lug in the first position and displaced below the lug in a second position, and wherein the abutment rod includes an abutment rod pivot axle pivotally mounting the lower distal end of the abutment rod to the trigger, and the abutment rod reciprocatably mounted within a receiving cavity, the receiving cavity including a cavity floor, and the abutment rod including an abutment rod plate, and an abutment rod spring captured between the plate and the cavity floor to bias the abutment rod into engagement with the lug.

2. An apparatus as set forth in claim 1 wherein the second rod tube includes a second tube entrance opening and a canister chamber positioned within the second rod tube below the entrance opening, and a trigger pivotally mounted within the second tube rearwardly of the canister chamber, wherein the trigger is pivotally mounted about a trigger axle, and a push plate pivotally mounted to the trigger axle, the push plate positioned within the second rod tube and defines a rear wall of the canister chamber, and a compressed gas canister positioned within the canister chamber forwardly of and in contiguous communication with the push plate, and a puncture spike mounted to a plurality of support ribs mounted within a forward distal end of the canister chamber, and a sealing plate secured to a forward end of the entrance opening canted downwardly into the canister chamber, with the sealing plate including a compressible foot in contiguous engagement with a forward end portion of the compressed gas canister to effect a sealing relationship thereto.

* * * * *